(12) United States Patent  (10) Patent No.: US 7,954,777 B2
Bohm et al.  (45) Date of Patent: Jun. 7, 2011

(54) ALIGNMENT UNIT FOR DIRECTIONAL RADIOS, IN PARTICULAR DIRECTIONAL RADIO ANTENNAS

(75) Inventors: Daniel Bohm, Eggersriet (CH); Romeo Premerlani, Appenzell (CH)

(73) Assignee: Huber+Suhner AG (CH)

( * ) Notice: Subject to any disclaimer, the term of this patent is extended or adjusted under 35 U.S.C. 154(b) by 231 days.

(21) Appl. No.: 12/096,862

(22) PCT Filed: Nov. 2, 2006

(86) PCT No.: PCT/CH2006/000615
§ 371 (c)(1),
(2), (4) Date: Jun. 10, 2008

(87) PCT Pub. No.: WO2007/068131
PCT Pub. Date: Jun. 21, 2007

(65) Prior Publication Data
US 2009/0002261 A1    Jan. 1, 2009

(30) Foreign Application Priority Data

Dec. 14, 2005  (CH) ....................................... 1980/05

(51) Int. Cl.
*E04G 3/00* (2006.01)
(52) U.S. Cl. ............... 248/278.1; 248/282.1; 248/284.1; 248/917; 248/397; 248/398; 248/274.1; 248/276.1; 248/921; 248/922; 248/923; 343/882; 343/892; 403/53; 403/62; 403/57; 403/116; 403/113
(58) Field of Classification Search ............... 248/278.1, 248/282.1, 284.1, 371, 397, 398, 917, 921, 248/922, 923, 274.1, 276.1; 343/882, 892; 403/53, 62, 57, 116, 113
See application file for complete search history.

(56) References Cited

U.S. PATENT DOCUMENTS

| | | | | |
|---|---|---|---|---|
| 1,935,246 A * | 11/1933 | Kirsch | .......................... | 403/205 |
| 4,470,106 A * | 9/1984 | Norton | .......................... | 362/398 |
| 5,074,513 A | 12/1991 | Presley et al. | | |
| 6,045,103 A * | 4/2000 | Costa et al. | ................. | 248/278.1 |
| 6,126,128 A * | 10/2000 | Costa et al. | ................. | 248/278.1 |
| 6,211,845 B1 | 4/2001 | Cook et al. | | |
| 6,264,152 B1 * | 7/2001 | Bloch et al. | ................. | 248/274.1 |
| 6,407,713 B1 * | 6/2002 | Mallenius | ...................... | 343/765 |
| 6,484,987 B2 * | 11/2002 | Weaver | ...................... | 248/278.1 |
| 6,535,177 B1 * | 3/2003 | Dhellemmes et al. | ........ | 343/882 |
| 6,664,937 B2 * | 12/2003 | Vermette et al. | .............. | 343/892 |
| 6,669,155 B2 * | 12/2003 | Ron | ............................ | 248/276.1 |

(Continued)

FOREIGN PATENT DOCUMENTS
EP    1413003 B1    4/2004

(Continued)

*Primary Examiner* — Terrell McKinnon
*Assistant Examiner* — Nkeisha J Smith
(74) *Attorney, Agent, or Firm* — The Webb Law Firm

(57) ABSTRACT

An alignment unit, which is of simple and robust design and can be adjusted well, for directional radios, in particular directional radio antennas, is distinguished by two attachment brackets, which are articulated on a common centre part such that they can pivot about two mutually orthogonal swivel axes, as well as two operating units for separate adjustment and fixing of the pivoting angle of the two attachment brackets relative to the centre part.

8 Claims, 2 Drawing Sheets

U.S. PATENT DOCUMENTS

| | | | |
|---|---|---|---|
| 7,408,526 B2* | 8/2008 | Pan | 343/880 |
| 7,439,930 B2* | 10/2008 | Bury | 343/878 |
| 2005/0264467 A1* | 12/2005 | Lin et al. | 343/882 |
| 2006/0022108 A1* | 2/2006 | Kuga | 248/422 |
| 2006/0181477 A1* | 8/2006 | Lin et al. | 343/880 |
| 2009/0267860 A1* | 10/2009 | Peng | 343/878 |

FOREIGN PATENT DOCUMENTS

| | | |
|---|---|---|
| FR | 2770688 | 5/1999 |
| JP | 63300698 | 12/1988 |
| JP | 7307606 | 11/1995 |
| WO | WO 99/41802 | 8/1999 |
| WO | WO 00/17955 | 3/2000 |

* cited by examiner

ALIGNMENT UNIT FOR DIRECTIONAL RADIOS, IN PARTICULAR DIRECTIONAL RADIO ANTENNAS

TECHNICAL FIELD

The present invention relates to the field of directional radio. It relates in particular to an alignment unit for directional radios, in particular directional radio antennas.

PRIOR ART

For cost reasons, small directional radio paths are being increasingly used to cover short distances, for example between adjacent buildings or the like, by means of communication links, comprising two small transceivers, which are aligned precisely with one another, and the corresponding antenna. When designing a directional radio link such as this, the appliances must be installed at suitable locations with a line of sight link, and must then be precisely aligned with one another. Mounting apparatuses and alignment units which can be fixed and adjusted are required for this purpose, which are mechanically robust, are of simple and cost-effective design, and which can also be adjusted easily and precisely.

In particular, an alignment unit such as this should comply with the following requirements:

Alignment must be possible at a distance of 1000 m to a precision of ±1°,

The mounting apparatus should be designed such that the antenna and its transmission lobe can be aligned at right angles to or parallel to the mounting surface. It should be possible to mount the antenna vertically, hanging or on the wall.

Since the antenna is polarized, it is necessary to ensure that the opposite antennas are always aligned identically (for example for wall mounting and hanging mounting).

The mounting apparatus should be able to be mounted on flat surfaces and on masts.

The movement freedom should be at least ±45° in azimuth, and ±45° in elevation.

A mechanical accuracy of ±0.5° should be achieved for azimuth and elevation adjustment.

Variation of the azimuth setting should not influence the elevation (or only minimally) (and vice versa).

The structure must be able to withstand wind speeds of 110 km/h such that the link is ensured (max. 1° change in the orientation of the antenna) and must be able to withstand maximum wind speeds of 200 km/h without damage.

Environmental conditions, such as operating temperatures from −30° C. to +55° C., must be complied with. The unit will be used outdoors and must therefore likewise be insensitive to precipitation and its consequences.

Only commercially available tools (including PC) may be used for installation.

The apparatus should, however, also have an attractive visual appearance.

DESCRIPTION OF THE INVENTION

The object of the invention is to provide an alignment unit which is of simple and robust design and which can easily be adjusted in the various directions.

The object is achieved by the totality of features in claim 1. The essence of the invention is the provision of two attachment brackets which are articulated on a common centre part such that they can pivot about two mutually orthogonal swivel axes, as well as two operating units for separate adjustment and fixing of the pivoting angle of the two attachment brackets relative to the centre part. The adjustment process is carried out by coarse alignment and fine alignment by means of an eccentric, and can be carried out with one hand.

One preferred refinement of the alignment unit according to the invention is characterized in that a mounting surface, which is parallel to the associated swivel axis, is formed on each of the two attachment brackets, in that the mounting surfaces are rectangular and have a plurality of attachment holes, which are distributed in the surface, for attachment of the antenna and/or on a holder, and in that the attachment holes are in the form of elongated holes which are parallel to the associated swivel axis.

Another refinement of the invention is distinguished in that the centre part and the two attachment brackets are each produced integrally as stamped and bent parts from a metal sheet, in that the centre part comprises a first base metal sheet, which is parallel to the two swivel axes and, in particular, is square, and from which first side metal sheets are bent in pairs at right angles in opposite directions in each case on opposite sides, and in that each of the swivel axes is mounted in a pair of side metal sheets of the centre part.

One preferred development is distinguished in that the attachment brackets each comprise a second base metal sheet from which two second side metal sheets are bent at right angles in one direction on opposite sides, and in that the attachment brackets are each mounted with the two second side metal sheets on a pair of first side metal sheets such that they can pivot about the associated swivel axis, in that a shaft bolt is in each case provided in order to mount the attachment brackets on the centre part such that they can pivot, and passes at right angles through the second side metal sheets and the associated pairs of first side metal sheets.

The operating units each preferably comprise adjustment means for fine adjustment of the pivoting angle of the attachment brackets, as well as means for fixing the attachment brackets in a specific angular position.

In particular, the operating units each comprise an intermediate piece, which is arranged between a first side metal sheet and a second side metal sheet and is mounted such that it can pivot about the respective swivel axis, in that an eccentric which can be operated from the outside is mounted such that it can rotate as adjustment means on the intermediate piece and interacts with a cutout in the first side metal sheet, and in that a clamping screw, which passes through the second side metal sheet from the outside can be screwed in on the intermediate piece as fixing means, by means of which the attachment brackets can be fixed relative to the intermediate piece.

BRIEF EXPLANATION OF THE FIGURES

The invention will be explained in more detail in the following text with reference to exemplary embodiments and in conjunction with the drawing, in which.

APPROACHES TO IMPLEMENTATION OF THE INVENTION

Figure 1:
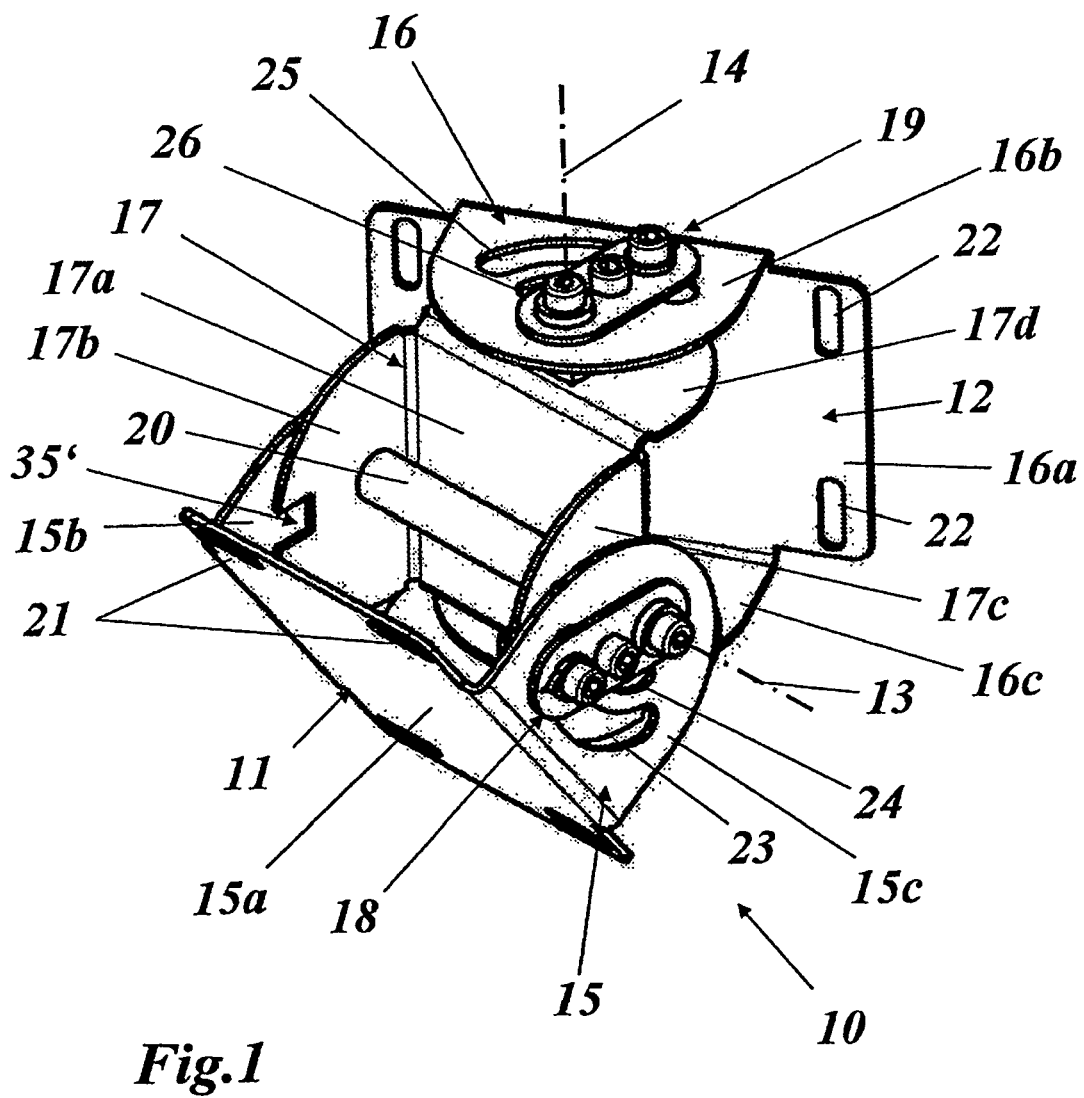
FIG. 1 shows a perspective illustration of one preferred exemplary embodiment of an alignment unit according to the invention.

FIG. 1 shows a perspective illustration of one preferred exemplary embodiment of an alignment unit according to the invention. The alignment unit comprises two attachment brackets 15 and 16 which are articulated on a common centre part 17 such that they can pivot about two mutually orthogonal swivel axes 13 and 14. Two separate operating units 18, 19 are provided for separate adjustment and fixing of the pivoting angle of the two attachment brackets 15, 16 relative to the centre part 17, and are associated with the respective attachment brackets 15, 16. The two attachment brackets 15 and 16 are of identical design, as are the operating units 18, 19, and are articulated in the same manner on the centre part, so that each of the attachment brackets 15, 16 can optionally be used for attachment of the directional radio or for attachment to the wall.

The centre part 17 and the two attachment brackets 15, 16 are each integral and are produced as simple stamped and bent parts at low cost from a metal sheet. A flat mounting surface 11 or 12, respectively, which is parallel to the respectively associated swivel axis 13 or 14, is formed on each of the two attachment brackets 15 and 16, respectively, and the antenna is attached to this mounting surface 11 or 12, and/or the mounting surface 11 or 12 can be used for attachment of the alignment unit to a wall or the like. The mounting surfaces 11, 12 are preferably rectangular and have a plurality of attachment holes 21, 22, which are arranged distributed on the surface, for attachment of the antenna or for attachment of the alignment unit to a holder, and these attachment holes 21, 22 are in the form of elongated holes, parallel to the associated swivel axis 13, 14, for better adaptability. The attachment holes 21, 22 can also be used for the fitting of attachment brackets when the alignment unit 10 is intended to be attached, with the antenna, to a vertical mast.

The centre part 17 of the exemplary embodiment comprises a first base metal sheet 17a, which is parallel to the two swivel axes 13, 14 and, in particular, is square, and from which first side metal sheets 17b, c and 17d are bent in pairs at right angles in opposite directions in each case on opposite sides. Each of the swivel axes 13, 14 is mounted in a pair of first side metal sheets 17b, c or 17d of the centre part 17. The free ends of the first side metal sheet 17b, c and 17d are rounded, in order to allow the corresponding pivoting movement of the attachment brackets 15, 16.

Figure 2:
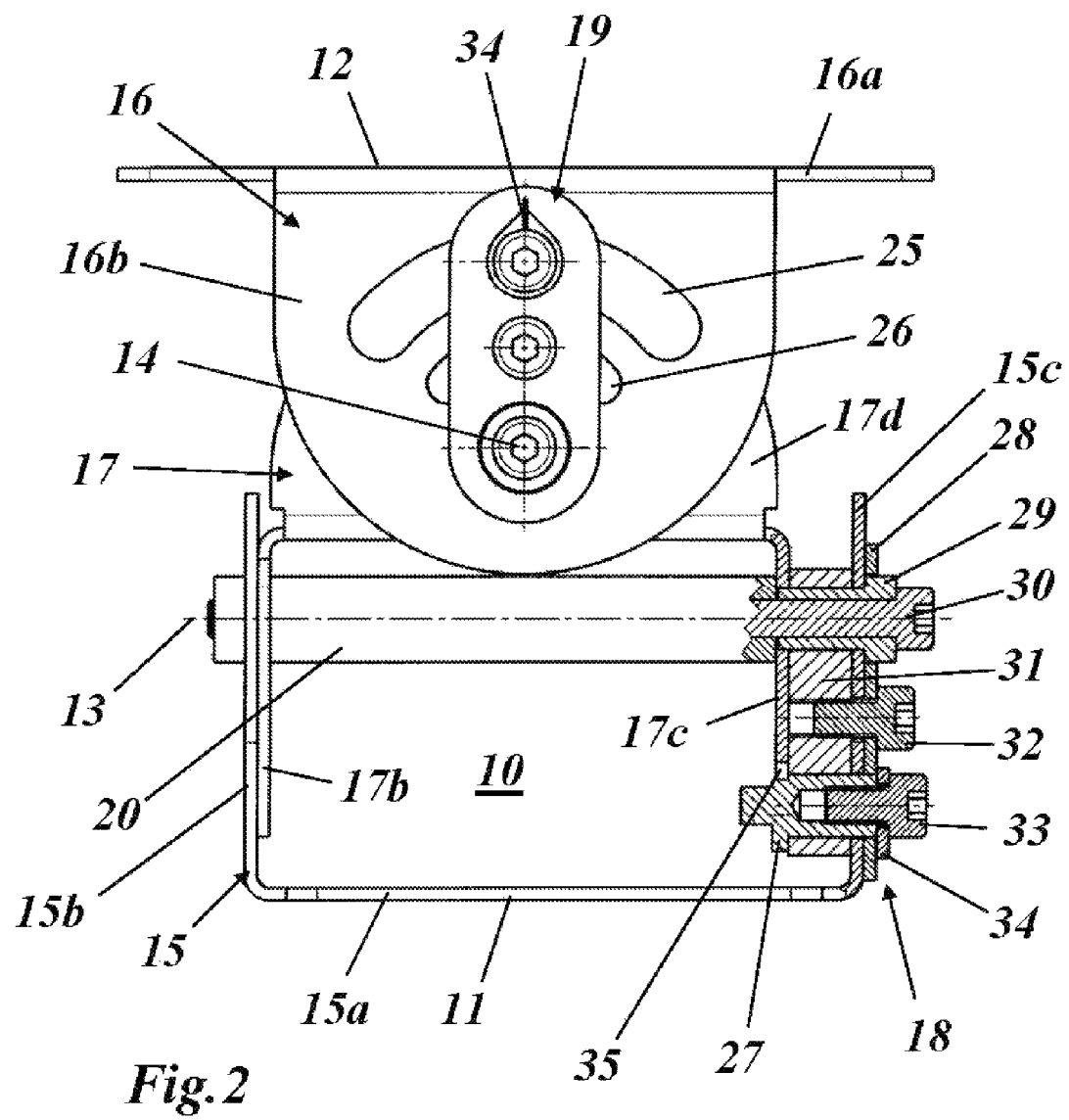
FIG. 2 shows a section through one of the two operating units of the alignment unit shown in FIG. 1.

The attachment brackets 15, 16 themselves each comprise a second base metal sheet 15a or 16a (whose outer face forms the mounting surface 11 or 12, respectively), from which two second side metal sheets 15b, c and 16b, c are bent at right angles in one direction on opposite sides. The free ends of the second side metal sheets 15b, c and 16b, c are also rounded. The attachment brackets 15, 16 are each mounted with the two second side metal sheets 15b, c and 16b, c on a pair of first side metal sheets 17b, c and 17d, respectively, such that they can pivot about the respectively associated swivel axis 13 or 14. The distance between the two side metal sheets 15b, c and 16b, c is (taking into account the intermediate piece 31; FIG. 2) for this purpose only slightly greater than the distance between the pairs of first side metal sheets 17b, c and 17d, respectively.

In order to mount the attachment brackets 15, 16 on the centre part 17 such that they can pivot, a shaft bolt 30 is provided in each of the swivel axes 13, 14 and passes at right angles through the second side metal sheets 15b, c and 16b, c, respectively, of the attachment brackets 15, 16 and the associated pairs of first side metal sheets 17b, c and 17d, respectively, of the centre part 17. As can be seen in FIG. 2, the shaft bolt 30 passes through a spacing sleeve 20, which is arranged between the first side metal sheets 17b, c, and through a bearing sleeve 29, which passes through the two side metal sheets 15c and 17c. This design of the swivel axes, 13, 14 makes it possible to coarsely set the pivoting angle and the associated attachment bracket relative to the centre part 17 by means of the hexagonal recess which is arranged on the head of the shaft bolt 30.

The shaft bolt 30 is in each case part of a respective operating unit 18 or 19, which each comprise adjustment means, which can be operated intrinsically independently of one another, for fine adjustment of the pivoting angle of the attachment brackets, as well as means for fixing the attachment brackets in a specific angular position. One important component of each of the operating units 18, 19 is an intermediate piece 31, which arranged between a first respective side metal sheet 17c or 17d and a second respective side metal sheet 15c or 16b and, by virtue of the bearing sleeve 29, is mounted on the shaft bolt 30 such as it can pivot above the respective swivel axis 13 or 14.

As adjustment means, an eccentric cam 27 which can be operated from the outside of the attachment bracket by means of the adjustment screw with a hexagonal recess is mounted on the intermediate piece 31 such that it can rotate and engages in a rectangular cutout (comparable to the cutout 35' which can be seen in FIG. 1) on the first side metal sheet 17c or 17d, respectively, and interacts in such a manner that, when the eccentric cam 27 is rotated, the intermediate piece 31 is pivoted relative to the centre part 17 through a small positive or negative angle, which can be adjusted precisely. Provided that the eccentric cam 27 is not operated, the intermediate piece 31 remains fixed relative to the centre part 17 when the attachment bracket 15 is pivoted through a relatively large angle. A pointer disc 34 is arranged between the eccentric cam 27 and the adjustment screw 33, (which is screwed firmly into the eccentric cam 27) and provides an external indication of the rotation position of the eccentric cam 27.

A clamping screw 32 which passes through the second side metal sheet (15c or 16b, respectively) from the outside and has a hexagonal recess can be screwed into the intermediate piece 31 in the operating units 18, 19 as fixing means, by means of which the attachment brackets 15 and 16, respectively, can be fixed in the respective pivoted position relative to the intermediate piece 31. The clamping process is made easier by a clamping metal sheet 28, by using the clamping screw 32 for pressing against the side metal sheet 15c.

Since the shaft bolt 30, the clamping screw 32 and the eccentric cam 27 are mounted in a fixed position in the intermediate piece 31 by means of the adjustment screw 33 and the intermediate piece 31 is fixed relative to the centre part, except for a small pivoting range, arc holes 23, . . . , 26, which are concentric with respect to the swivel axes 13, 14, for the clamping screws 32 and for the eccentric cam 27 must be provided in the second side metal sheets 15b, c and 16b, c, in order to ensure a coarse pivoting range of about ±45°.

LIST OF REFERENCE SYMBOLS

10 Alignment unit
11, 12 Mounting surface
13, 14 Swivel axis
15, 16 Attachment bracket
15a, 16a Base metal sheet
15b, c; 16b, c Side metal sheet
17 Centre part
17a Base metal sheet
17b, c, d Side metal sheet
18, 19 Operating unit
20 Spacing sleeve
21, 22 Attachment hole (elongated hole)
23, . . . , 26 Arc hole (90°)
27 Eccentric cam 28 Clamping metal sheet
29 Bearing sleeve
30 Shaft bolt
31 Intermediate piece
32 Clamping screw
33 Adjustment screw
34 Pointer disc
35' Cutout (rectangular)

The invention claimed is:

1. An alignment unit for directional radios, comprising two attachment brackets, which are articulated on a common centre part for pivoting about two mutually orthogonal pivoting shafts, two operating units for separate adjustment and fixing of a pivoting angle of the two attachment brackets relative to the centre part,
wherein the alignment unit further includes an eccentric cam for providing fine adjustment of the pivoting angle of the two attachment brackets relative to the centre part,
wherein the centre part and the two attachment brackets each comprise a metal sheet having integral bent parts, and
wherein the centre part comprises a first base metal sheet, which is parallel to the two pivoting shafts and is square, and first side metal sheets that are bent in pairs at right angles with respect to the first base metal sheet in opposite directions on opposite sides of the first base metal sheet, and each of the pivoting shafts is mounted in a pair of side metal sheets of the centre part.

2. The alignment unit according to claim 1, wherein a mounting surface, which is parallel to the associated pivoting shaft, is formed on each of the two attachment brackets.

3. The alignment unit according to claim 2, wherein the mounting surfaces are rectangular and each have a plurality of attachment holes, which are distributed in the mounting surface, for attachment of an antenna and/or on a holder.

4. The alignment unit according to claim 3, wherein the attachment holes are in the form of elongated holes which are parallel to the associated pivoting shaft.

5. The alignment unit according to claim 1, wherein the metal sheets of the attachment brackets are a second base metal sheet and two second side metal sheets that are bent at right angles with respect to the second base metal sheet in one direction on opposite sides of the second base metal sheet, and the attachment brackets are each mounted with the two second side metal sheets on a pair of first side metal sheets such that they can pivot about the associated pivoting shaft.

6. The alignment unit according to claim 5, wherein a shaft bolt is provided in order to mount each attachment bracket on the centre part such that the attachment brackets can pivot, and wherein the bolts pass at right angles through each of the second side metal sheets and its associated pair of first side metal sheets.

7. The alignment unit according to claim 5, wherein the operating units each comprise an adjustment means for fine adjustment of the pivoting angle of the attachment brackets, and a well as means for fixing the attachment brackets in a specific angular position.

8. An alignment unit for directional radios, comprising two attachment brackets, which are articulated on a common centre part for pivoting about two mutually orthogonal pivoting shafts, two operating units for separate adjustment and fixing of a pivoting angle of the two attachment brackets relative to the centre part,
wherein the centre part comprises a first base metal sheet, which is parallel to the two pivoting shafts and is square, and first side metal sheets that are bent in pairs at right angles with respect to the first base metal sheet in opposite directions on opposite sides of the first base metal sheet, and each of the pivoting shafts is mounted in a pair of side metal sheets of the centre part,
wherein the attachment brackets each comprise a second base metal sheet and two second side metal sheets that are bent at right angles with respect to the second base metal sheet in one direction on opposite sides of the second base metal sheet, and the attachment brackets are each mounted with the two second side metal sheets on a pair of first side metal sheets such that the attachment brackets can pivot about the associated pivoting shaft,
wherein the operating units each comprise an adjustment means for fine adjustment of the pivoting angle of the attachment brackets, and a means for fixing the attachment brackets in a specific angular position, and
wherein the operating units also each comprise an intermediate piece, which is arranged between a first side metal sheet and a second side metal sheet and is mounted such that the intermediate piece can pivot about the respective pivoting shaft, wherein an eccentric cam, which can be operated from an outside of the attachment bracket, is mounted such that the eccentric cam can rotate as an adjustment means on the intermediate piece and interacts with a cutout in one of the first side metal sheets, and wherein a clamping screw, which passes through one of the second side metal sheets from the outside is screwed on the intermediate piece as a fixing means, for fixing the attachment brackets relative to the intermediate piece.

* * * * *

UNITED STATES PATENT AND TRADEMARK OFFICE
CERTIFICATE OF CORRECTION

| | | |
|---|---|---|
| PATENT NO. | : 7,954,777 B2 | Page 1 of 1 |
| APPLICATION NO. | : 12/096862 | |
| DATED | : June 7, 2011 | |
| INVENTOR(S) | : Bohm et al. | |

It is certified that error appears in the above-identified patent and that said Letters Patent is hereby corrected as shown below:

Column 6, Line 8, Claim 7, "a well as means" should read -- a means -- (delete "well as")

Signed and Sealed this
Twenty-fifth Day of October, 2011

David J. Kappos
*Director of the United States Patent and Trademark Office*